J. A. HOCK.
MULTIPLE DISK CUTTING-OFF MACHINE.
APPLICATION FILED APR. 23, 1912.

1,061,940.

Patented May 13, 1913.

WITNESSES

INVENTOR

UNITED STATES PATENT OFFICE.

JOHN A. HOCK, OF PITTSBURGH, PENNSYLVANIA, ASSIGNOR TO THE NATIONAL TUBE COMPANY, OF PITTSBURGH, PENNSYLVANIA, A CORPORATION OF NEW JERSEY.

MULTIPLE-DISK CUTTING-OFF MACHINE.

1,061,940. Specification of Letters Patent. Patented May 13, 1913.

Application filed April 23, 1912. Serial No. 692,715.

*To all whom it may concern:*

Be it known that I, JOHN A. HOCK, a citizen of the United States, residing at Pittsburgh, in the county of Allegheny and State of Pennsylvania, have invented certain new and useful Improvements in Multiple-Disk Cutting-Off Machines, of which the following is a specification.

My invention relates to the construction of cutting apparatus having a series of rotary cylindrical cutting disks arranged to contact with and simultaneously cut cylindrical materials into a plurality of pieces, and the invention more particularly relates to the construction and arrangement of a multiple disk cutting-off machine adapted for use in severing a series of integrally formed connected couplings into individual couplings after the welding operation and preparatory to the later machining operations by which the couplings are reamed and finished to length and are tapped to provide the internal screw threads thereon. In the manufacture of the smaller sizes of such couplings three and four couplings are formed by welding the ends of a flat plate, the bending and welding being performed in the same operation or step in the manufacture of the couplings.

One object of my invention is to provide a cutting-off machine having a series of disk cutters constructed and arranged to rapidly sever a series of integrally welded couplings into separate, individual couplings and to cut the couplings true to length.

Another object of the invention is to provide a multiple disk cutting-off machine having novel means whereby a relative sidewise movement of the disks is effected and relative sidewise adjustment of the disks necessary on account of stretching or increase in the over all length of the series of couplings being severed is automatically afforded to the end that the couplings are made of the exact length desired.

Further objects of my invention will appear as more fully described and claimed hereinafter.

Figure 1:
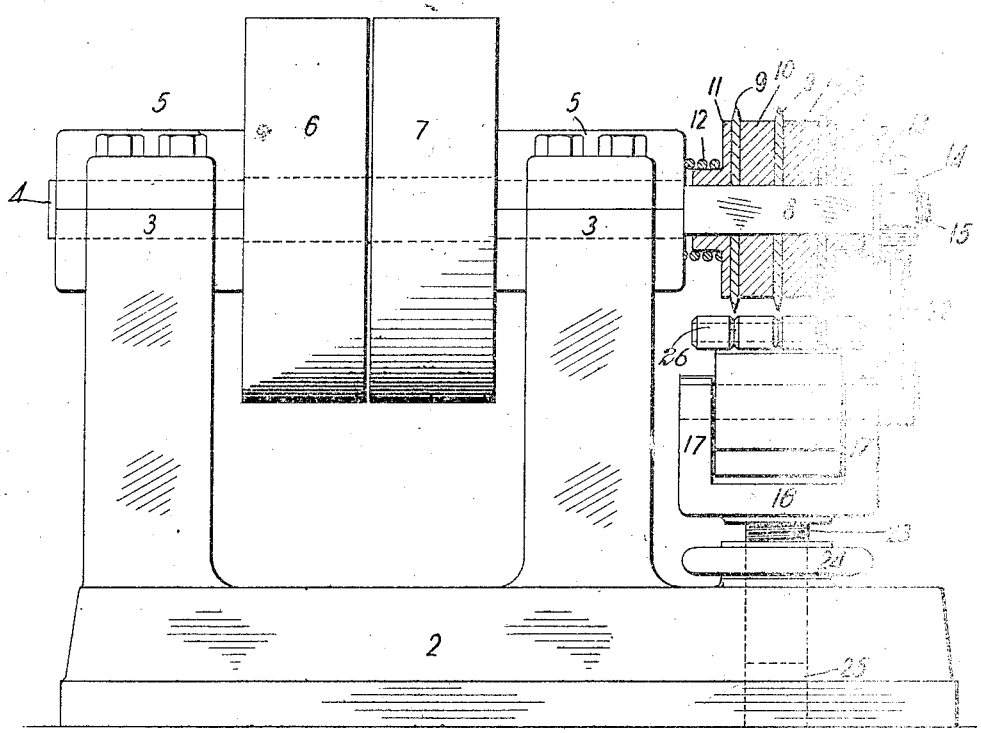
Figure 2:
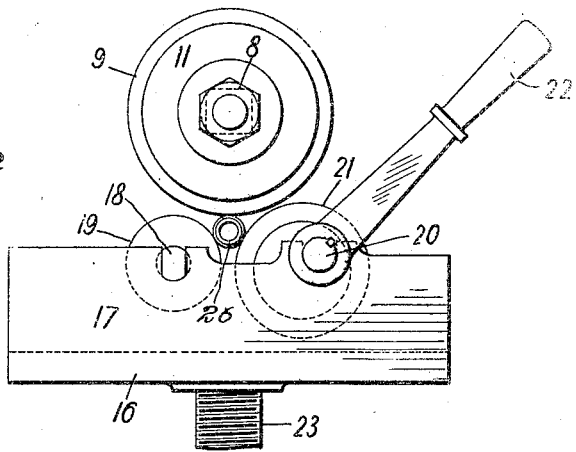

Referring to the accompanying drawings Figure 1 is a side elevation showing a multiple disk cutting-off machine constructed and arranged in accordance with my invention. Fig. 2 is an end elevation of the same, showing a series of integrally formed couplings in position on the coupling support in readiness for the cutting operation.

In the drawings the numeral 2 designates the base of the apparatus having bearings 3, in which the shaft 4 is rotatably mounted. The shaft is maintained in place by means of bearing caps 5 of the usual construction. Mounted on the shaft 4, between the bearings 3, 3 are fast and loose pulleys 6 and 7, the fast pulley 6 being keyed or otherwise secured on the shaft 4 so as to positively rotate the shaft, and the loose pulley 7 being arranged to run idly on the shaft. The pulleys 6 and 7 are connected by means of a belt with the driven pulley or a counter-shaft or other prime mover (not shown). One end of the shaft 4, which projects beyond one of the bearings 5 is square in cross section and mounted on the squared portion 8 of the shaft is a series of cylindrical cutters or disks 9. The separators 10 placed between the disks 9 position the disks in the spaced apart relation desired or required at the beginning of the cutting operation of the disks and by the substitution of similar separators of greater or lesser width for those shown, the distance between the saws can be varied at will. The central openings or holes in the disks and the separators 10 are square so that the squared portion 8 of the shaft will engage and positively rotate the disks and separators when the shaft is driven through the pulley 6. Flanged sleeves 11 are mounted on the squared portion 8 of the shaft 4 with their flanged faces in engagement with the outside faces of the outer cutting disks 9 and the helical springs 12 mounted on the hub portion of the sleeve 11 are arranged to yieldingly hold the face of the sleeves 11 in engagement with the cutters 9 and maintain the cutters in the spaced apart position shown in the drawings, the faces of the cutters and the separators being in engagement. The outer end of a spring 12 engages with the end of the adjacent bearing 3 and the outer end of another spring 12 engages with a washer 13 which is secured in place on the squared end of the shaft 4 by means of a nut 14 on the reduced screw threaded outer end 15 of the shaft.

Beneath the cutters mounted on the squared portion 8 of the shaft 4 is an adjustable support which, as shown, is formed of a carrier 16 which is U-shaped in cross section, the sides 17 of this carrier having notches in their upper marginal edges in which the shaft 18 for the idler roller 19 and the shaft 20 for the eccentrically mounted idler roller 21 are mounted. The shaft 20 is mounted in its bearings so that the roller 21 will rotate on the shaft in a path eccentric to the axis of the bearings for the shaft 20 and a hand lever 22 is keyed or otherwise secured on one end of the shaft 20 by which the roller 21 is moved eccentrically about the axis of the shaft 20.

The support 16 has a vertically extending screw portion 23 on which the hand wheel 24 is placed and the screw threaded portion 23 which extends downwardly into an opening 25 in the base 2 in securing the support 16 in adjusted position on the base beneath the cutting disks is raised and lowered as required by rotating the hand wheel 24.

In the operation of my improved apparatus the multiple couplings or other articles to be severed into pieces are placed between the rollers 19 and 21 below the cutters 9. The lever 22 is then swung about the axis of the shaft 20 so as to move the roller 21 eccentrically and cause the multiple length coupling 26 supported on the rollers to move upwardly into engagement with the positively driven rotating cutters 9 which have been started in operation. The movement of the hand lever 22 gradually lifts the coupling into cutting engagement with the disks 9 and as this movement is continued the cutters quickly sever the multiple length couplings into single couplings. At the beginning of the severing operations the tapering peripheral edges of the cutters form a V-groove in the outer surface of the coupling in forming couplings of the required length. As the grooves become deepened in the severing operations the grooves act as a guide to move the end cutters 9 outwardly against the resistance of the springs 12 so as to cut the encircling grooves in the couplings in the desired position, as the over all length of the series of yet connected couplings increases, as it does in the severing operations. After the grooves have been formed of sufficient depth the couplings are separated from one another and the severed couplings are removed. The springs 12 then act to move the cutters 9 again into engagement with the separators in the relative position shown in the drawings. The above described operations are then continued as desired in severing other series of integrally formed connected couplings into individual couplings in the same manner as has just been described.

The advantages of my invention will be apparent to those skilled in the art. By means of the relatively movable cutting disks, a series of integrally connected couplings are severed simultaneously and are cut to the required length and the grooves formed in the severing operations are parallel with each other and are formed at the right distance apart. The stretching or increase in the length of the couplings does not form a wide groove or spiral groove in the couplings during the severing operations as the couplings move lengthwise on the driving shaft to locate the grooves at the desired distance apart. The apparatus is simple and is easily kept in repair.

Changes may be made in the construction and arrangement of the apparatus without departing from my invention as defined in the appended claims.

I claim:—

1. A cutting-off machine comprising a driving shaft, a plurality of cutting disks mounted thereon, spacing means separating the disks on the shaft, said disks being relatively movable axially, and means yieldingly holding said disks in engagement with said spacing means to permit relative axial movement of the disks during the cutting operations.

2. A cutting-off machine comprising a driving shaft, at least three cutting disks mounted thereon, spacing means separating the disks, said disks being relatively movable axially on the shaft, and means yieldingly holding said disks in engagement with said spacing means to permit relative axial movement of the disks during the cutting operations.

3. A cutting-off machine comprising a plurality of cutting disks, a shaft for positively rotating said disks on which the disks are mounted and relatively movable axially, spacing means separating said disks, and means for yieldingly holding the disks in engagement with said spacing means to permit relative axial movement of the disks during the cutting operations.

4. A cutting-off machine comprising at least three cutting disks, a shaft for positively rotating said disks on which the disks are mounted to be relatively movable axially, spacing means separating said disks, and means yieldingly holding the disks in engagement with said spacing means to permit relative axial movement of the disks during the cutting operations.

5. A cutting-off machine comprising a driving shaft, a plurality of cutting disks mounted thereon, spacing means separating the disks, said disks being relatively movable axially, means yieldingly holding said disks in engagement with said spacing means to permit relative axial movement of the disks during the cutting operations, and means for supporting materials being cut by said disks, said means being arranged to move the materials into engagement with the cutting disks.

6. A cutting-off machine comprising a driving shaft, at least three cutting disks mounted thereon and rotated thereby, spacing means separating the disks, said disks being relatively movable axially on the shaft, means yieldingly holding said disks in engagement with said spacing means to permit relative axial movement of the disks during the cutting operations, idler rollers beneath the disks to support materials being severed, and means for moving the materials on said rollers to bring the materials into cutting engagement with said disks.

7. A cutting-off machine comprising a driving shaft, at least three cutting disks mounted on said shaft, spacing means separating the disks on the shaft, said disks being relatively movable axially on the shaft, means yieldingly holding said disks in engagement with said spacing means to permit relative axial movement of the disks during the cutting operations, idler rollers beneath the cutters to support materials being severed, and means for relatively adjusting said rollers to move materials supported thereon into cutting engagement with said cutting disks.

In testimony whereof, I have hereunto set my hand.

JOHN A. HOCK.

Witnesses:
 ROBERT M. ERSKINE,
 H. R. GILBERT.